Patented Dec. 30, 1952

2,623,852

UNITED STATES PATENT OFFICE 2,623,852

OIL COMPOSITION

Walter H. Peterson, Point Richmond, Calif., assignor to Shell Development Company, San Francisco, Calif., a corporation of Delaware No Drawing. Application December 19, 1949, Serial No. 133,962

17 Claims. (Cl. 252—28)

This invention relates to improved oleophilic compositions and to their preparation, and more particularly to compositions comprising oleophilic materials associated, or adapted to be associated, with hydrophilic materials. More specifically, the invention is concerned with improved lubricating compositions, and particularly with lubricating greases comprising oils, such as mineral oils, associated with hydrophilic solid inorganic materials of the character of inorganic gels (silica gel, alumina gel, bentonite, etc.) as gelling agent for the oil, and their preparation.

Compositions comprising oleophilic (hydrophobic) substances intimately associated with hydrophilic (oleophobic) solid inorganic substances have previously been proposed and utilized for various purposes. Thus, greases comprising mineral lubricating oils gelled with inorganic gelling agents incorporated therein have been described in the Kistler U. S. Patent No. 2,260,625, and they have been found to be useful as replacements for ordinary soap greases, especially where high temperature lubrication is required. In comparison with ordinary soap greases, the mineral oil-inorganic gel greases possess the outstanding characteristic of structural stability at elevated temperatures. This property makes such greases of particular interest in the lubrication of ball bearings and other machinery parts, as well as in turbo jet engines and in steel rolling mills.

It is a well known expedient for the dispensing and distribution of highly toxic insecticidal agents, many of which are highly oleophilic to the particular area desired to be treated therewith, to incorporate the toxic agent with a solid carrier (dust) therefor, usually hydrophilic, and to apply the dust comprising the finely divided particles of hydrophilic solid inorganic (talc and the like) material coated with the insecticidal agent to the area to be treated.

Finely divided hydrophilic inorganic materials, such as bentonite, have been incorporated in mineral oils in the production of oil-base drilling muds utilized in the drilling of oil wells.

However, one of the shortcomings of such systems as indicated hereinbefore is that they are sensitive to the presence of water. Thus, in the case of the inorganic gel greases, unless they are carefully formulated and prepared under specified conditions, any contact with water or with water vapor causes disintegration of the grease due to a breakdown of the particular association between the oil and the inorganic gel which is required for maintenance of the grease gel structure. Similarly, the initial presence of water associated with the inorganic gel may prevent the establishment of the relationship required for the formation of the grease gel structure.

Another shortcoming of systems concerned with here, particularly those which are used in contact with metal surfaces, such as in the lubrication of relatively moving metal surfaces, is their tendency to be corrosive to the metal or to become corrosive during use. It is quite possible that increased corrosivity is attributable to the heterogeneous character of the compositions with an increased tendency toward oxidation and concomitant increased corrosivity as a result of corrosive oxidation products formed.

It is a principal object of this invention, therefore, to provide improved compositions comprising an oleophilic material associated with a hydrophilic solid inorganic substance. Another object of the invention is to provide such compositions which are more resistant to the adverse effect of water thereon. A more specific object of the invention is to provide improved water-resistant lubricating greases gelled with hydrophilic inorganic compounds, such as inorganic oxides (including combinations of different metallic oxides as well as combinations of metallic and non-metallic oxides), inorganic hydroxides and other inorganic gelling agents. A still more specific object of this invention is to provide improved water-resistant lubricating greases comprising mineral oil gelled with silica gel. A further object is to provide modified, initially hydrophilic, solid inorganic substances which are adapted to produce improved products when incorporated with oleophilic materials, and particularly hydrocarbon oils. A related object is to provide compositions comprising oleophilic substances which are adapted to produce improved products when intimately contacted with hydrophilic solid inorganic substances. These objects will be more fully understood and other objects will become apparent from the description of the invention hereinafter.

In accordance with the present invention, it has now been found that compositions comprising oleophilic materials intimately associated with, or during their utility become intimately associated with, hydrophilic solid inorganic materials, and particularly such materials which are in the condition of having a relatively very large ratio of surface to volume as in the case of inorganic oxide gels, may be improved to an outstanding degree by the incorporation therewith of an organic amino hydroxy compound, containing at least three amino nitrogen atoms and oxy groups together and spaced apart in the molecule, in general, by not more than about 25 carbon atoms and preferably by not more than about ten carbon atoms, and said compound preferably containing an oleophilic (hydrophobic) organic radical containing at least six, and preferably from about 10 to about 30 carbon atoms. More specifically, it has now been found that compositions comprising oleaginous materials intimately associated with hydrophilic, preferably anionic, solid inorganic substances of relatively very large specific surface area, such as silica gels and the like, are materially improved by the presence therein of a minor amount (preferably 20–70% by weight of the inorganic substance) of a partially hydrophobic, poly amino oxy organic compound containing at least two of one and one of the other of said groups attached to three different carbon atoms in a 1, 2, 3-relationship, said compound also containing a highly hydrophobic organic radical, such as a hydrocarbyl radical of from 6 to 30 or more carbon atoms and hydroxy-, amino-, sulfhydryl-, etc., derivatives thereof.

Still more specifically, it has been found that a grease comprising a hydrocarbon oil thickened or gelled by the presence of silica gels, and the like inorganic gel-like substances, may be waterproofed to an outstanding degree and also be enhanced with respect to corrosivity and oxidation stability by the incorporation therewith of a minor proportion of a higher fatty acid amide of condensation products of halohydrins and derivatives thereof such as epichlorohydrin and simple basic =NH-containing compounds such as ammonia and low molecular weight primary and secondary amines.

It is also contemplated, within the scope of the present invention, to prepare water-resistant oleophilic clays from initially hydrophilic clays, by an ion exchange type of reaction between hydrophilic clays and the improving agents of this invention, which agents will be described hereinafter, and also to prepare or formulate water-resistant greases and oil base drilling fluids from such water-resistant clays and oleaginous materials, such as mineral lubricating oil. Further, an improved method for the preparation of a clay-oil grease or other products comprises first treating a clay hydrogel with an improving agent of this invention and then directly incorporating the resulting water-resistant clay in a lubricating oil or other suitable hydrocarbon fraction, without resorting to an intermediate dehydration step.

As already indicated, a preferred field of application of the present invention is in the preparation of improved grease compositions of the so-called inorganic gel type. Such greases may be prepared by the use of various hydrophilic inorganic materials, including alkaline earth methal oxides and hydroxides, alkaline earth metal carbonates, alkali metal carbonates, various polyvalent metal oxides such as silica, magnesia, alumina, ferric oxide, vanadium pentoxide and other heavy metal oxides, polyvalent metal sulfides, and some metallic sulfates and phosphates. Additionally, various hydrophilic naturally occurring colloidal inorganic compounds may be used, which compounds in most cases may be considered to be chemical combinations of two or more different metallic oxides. Thus, the naturally occurring magnesium silicates, aluminum silicates, magnesium and aluminum silicates, and the like, may be considered to be chemical combinations of magnesium oxide and silicon dioxide, aluminum oxide and silicon dioxide, and magnesium oxide-aluminum oxide-silicon dioxide, respectively; the acid clays containing also chemically combined hydrogen oxide. Some representative naturally occurring materials which are particularly suitable are the bentonites, Fuller's earth, Hectorite, talc, vermiculite, and the like. Preferably the swelling type of bentonites is employed. The Wyoming montmorillonite and the magnesium montmorillonite, such as Hectorite, have been found to be particularly effective grease gelling agents, particularly when treated as described hereinafter, in accordance with this invention.

Various grease forming base liquids may be utilized in the preparation of the inorganic gel greases. In general, it is preferred to use the usual range of hydrocarbon oils, particularly the mineral lubricating oils, which are employed in the preparation of ordinary soap greases. Synthetic liquid hydrocarbons may be used, also, including various alkylated aromatic hydrocarbons such as the butylated-, amylated-, cetylated-, and the like, naphthalenes; polymerized olefins such as suitable liquid polyethylenes, polybutylenes, polycetenes, and the like. Various other oleaginous liquids, including naturally occurring materials such as vegetable and animal oils, and synthetic lubricants may be used. Examples of the latter class include the diesters of dicarboxylic acids, such as bis-(2-ethylhexyl)-sebacate, bis-nonyl ethyl succinate; the inorganic esters such as the phosphate esters, both alkyl and aryl and mixed alkyl aryl phosphates, representative substances being tributyl phosphate, trioctyl phosphate, tricresyl phosphate and dioctyl cresyl phosphate. Mixtures of such lubricants may be employed as well. For special purposes involving high temperature use, or for analogous utility, the polymeric silicones may be used with advantage. For non-flammable purposes highly halogenated hydrocarbons, particularly chlorinated hydrocarbons, such as hexachlorobutadiene are useful.

The improving agents of the present invention, to be used in the greases and other oleophilic compositions, as well as for the separate treatment of, or incorporation with, individual constituent components of such compositions, are at least partially oleophilic organic amino oxy compounds which contain a plurality of (at least three) amino nitrogen atoms and hydroxy or alkoxy groups, taken together. In a preferred class of the agents, two of one and one of the other of amino and hydroxy groups are attached to different but proximate carbon atoms such that no two of them are separated by more than ten other atoms. By the terms "amino nitrogen atom," "amino group," and others of similar import, is meant a nitrogen atom directly attached to a carbon atom, regardless of whether the nitrogen atom is also attached to hydrogen atoms, other carbon atoms and/or to some other atom or atoms, and also regardless of what other atom or atoms may be attached to the nitrogen-bonded carbon atom. Thus the terms are meant to include alkyl amino compounds and also acyl amino compounds (amides), as well as alkyl acyl amino compounds. By the term "oxy" is meant hydroxy and alkoxy. Thus, the agents are at least partially oleophilic polyamino alcohols or polyhydroxy amines and corresponding ethers, including, and preferably for the practice of the invention, polymers of the simple, low molecular weight, materials polyamino-alcohols and polyhydroxy amines which come within the foregoing definition, and N-reaction products of the monomers or polymers thereof and mixtures thereof. A particularly preferred class of said agents is the class of organic acid reaction products of said low molecular weight substances and their polymers, particularly the amides which may thus be formed from the low molecular weight monomeric diamino (primary or secondary) alkanols or dihydroxy alkylamines (primary or secondary), by amidation (preferably only partially) of the amino groups thereof by reaction with a fatty acid containing from about 12 carbon atoms to about 24 carbon atoms, and corresponding amides of polymers (particularly dimers and trimers and mixtures thereof) of said low molecular weight monomeric substances.

The preparation of the improving agents of this invention is exemplified by the condensation of ammonia or primary or secondary amines with a suitable polyfunctional halohydrin, such as monohalodihydroxy - compounds, including their epoxy derivatives, such as epihalohydrins, and dihalo-monohydroxy-compounds. The simplest poly amino hydroxy reaction products thus obtainable, and preferably polymeric products thereof, are reacted with highly oleophilic organic compounds reactive therewith, particularly with the amino groups, such as various organic acylating compounds, and particularly the fatty acids. The amino (NH) reactant which is condensed with the halohydrin preferably is ammonia or an amine which contains a hydrocarbyl (preferably aliphatic radical(s) or other organic substituent radical having not more than 20 carbon atoms per radical, preferably 10. These include the primary aliphatic amines such as methylamine, ethylamine, up to dodecylamine, the secondary aliphatic amines such as dimethylamine, methyl ethylamine, dipropylamine, dihexylamine, and the like, the polyamines such as ethylene diamine, propylene diamine, tetraethylene pentamine, and the like, as well as the amines which contain various substituent polar groups. In general, the amino reactant should have a molecular weight which is not greater than about 250, while it is preferred to use those which have molecular weights no greater than about 150, including any substituent groups therein.

While the condensation products formed from epichlorohydrin, in accordance with the invention, are preferred, the general class of monohaloepoxyalkanes has been found to be particularly suitable for use in the invention, and especially when the amine condensation products thereof are acylated with fatty acids having at least 12 carbon atoms per molecule. Preferably the haloepoxyalkanes should have no more than 10 carbon atoms in the molecule, and typically suitable representative species of these include:

Epichlorohydrin (1,2-epoxy-3-chloropropane)
2,3-epoxy-4-chlorobutane
1,2-epoxy-3-isopropyl-3-iodopropane
1,2-epoxy-4-chlorobutane
1,2-epoxy-5-chloropentane
1,2-epoxy-3-methyl-3-chloropropane
1,2-epoxy-3,3-dimethyl-3-chloropropane
1,2-epoxy-2-methyl-3-bromopropane
2,3-epoxy-4-methyl-1-chlorohexane
1,2-epoxy-4-methyl-5-bromopentane Another class of halohydrins which are particularly suitable for the preparation of the agents of this invention are the monohalodihydroxyalkanes, representative suitable species of which are:

2-chloro-1,3-dihydroxypropane
1-chloro-2,4-dihydroxybutane
1-chloro-2,3-dihydroxybutane
1-chloro-2,6-dihydroxyhexane
3-chloro-1,6-dihydroxyhexane
1-chloro-2,4-dihdyroxy-3-methylbutane
2-chloro-1,6-dihydroxy-3,4-dimethylhexane
1-iodo-2,3-dihydroxypropane
1-bromo-2,3-dihydroxypropane
2-bromo-1,3-dihydroxypropane It is generally preferred to prepare the condensation products from these monohalodihydroxy compounds in the presence of a dehydrating catalyst such as a strong alkali hydroxide.

Amine-halohydrin condensation products of higher molecular weight may be obtained by condensation of the amino compound (preferably ammonia) with dihalohydrins, a preferred compound being 1,3 - dichloro - 2 - hydroxypropane. Suitable specific dihalohydrins include:

1,2-dichloro-3-hydroxypropane
1,6-dichloro-2,5-dihydroxyhexane
1,3-dibromo-2-hydroxypropane
1,4-diiodo-2,5-dihydroxypentane
1,4-dichloro-3-methyl-4-hydroxybutane
1,3-dichloro-3,6-diethyl-5-hydroxyhexane Also, the dihalohydrins are particularly useful compounds for the preparation of resinous materials to be used for the purpose of the invention, by the reaction of said dihalohydrins with alkylene polyamines, preferably tetraethylenepentamine. Other representative suitable compounds are:

1,3-diaminopropane
1,4-diamino-n-butane
1,3-diamino-n-butane
1,5-diamino-n-pentane
1,6-diamino-n-hexane
1,10-diamino-n-decane
1,6-diamino-3-methyl-n-hexane
3,3'-diamino dipropyl ether The acylated derivatives of the condensation products formed from the dihalohydrins and the alkylene polyamines exhibit a special response to heat treatment when incorporated in the inorganic gel greases, wherein the grease composition is heated at a temperature of 150–225° C., to improve the stability of the grease, including its water resistance, the product becoming highly resistant to water action in this case.

The amine-halohydrin condensation products of the invention are generally formed by interaction of the amine with the halohydrin under suitable reacting conditions, which may be below normal ambient room temperature or at an elevated temperature, depending on the reactivities of the particular substances involved. The initial condensation product may be caused to condense further or to polymerize, generally by maintaining it at the initial reaction condition for an extended period of time and/or by heating the material to a still higher temperature. The condensation product may then be converted to more oleophilic materials, if desired, by causing it to react with an oleophilic compound which is reactive therewith, such as an organic acid containing an oleophilic radical. In view of the many variable factors involved in the preparation of the agents of the invention, the influences of which on the selection of specific conditions for the preparation of particular agents will be readily understood from the description herein, the preparation of the products will be described with respect to a specifically illustrative preparation from preferred materials. It will be understood that the operations described and the conditions employed may be utilized to a large degree in the preparation of analogous compounds from other combinations of reactants which have already been indicated.

In a preferred embodiment of the invention, epichlorohydrin is added dropwise or at least in small incremental portions to concentrated aqueous or alcoholic ammonia at a temperature between about 20° C. and about 60° C., and preferably at a temperature of from about 30° C. to about 50° C., optimum control of the reaction being obtained at about 40° C. The time of addition of the epichlorohydrin to the ammonia and the subsequent period of heating may be from about 10 minutes to about four hours or more. It has been found that a period of about 20 minutes for incorporation of the ingredients followed by an hour of heating usually results in complete reaction. An excess of ammonia, over that required to react with any halogen present and any epoxy groups, is usually employed, a ratio of ammonia to halohydrin of from about 4:1 to 20:1 generally being employed. When the ratio is between 5:1 and 10:1, complete reaction of the epichlorohydrin appears to take place under the conditions described above. Following addition of the reactants and subsequent heating, the excess of ammonia is removed, usually by volatilization. Since the halogen of the halohydrin is converted, for the most part, to inorganic halide salt (ammonium chloride) and since the presence of such inorganic salt is usually not to be desired in the finished product, it is removed by any suitable means. A suitable method is to heat the reaction mixture with a strong inorganic base such as sodium hydroxide in an amount equivalent to the chloride present, thereby replacing the ammonia (from the ammonium chloride) which is removed by volatilization, and forming sodium chloride, which may be separated from the hot fluid mass by centrifugation, filtration, or the like, either at this time or after any subsequent acylation. The reaction mixture is then heated to a temperature between about 100° C. and 170° C., until all of the water or alcohol present has been evaporated. Lower temperatures may be used as reduced pressures are employed for this dehydrating step. The condensation product thus obtained is a somewhat water-soluble, crystalline material, more or less white in appearance, which changes to a straw-colored (yellow-orange) tacky fluid mass when heated to a temperature of about 140° C. It is soluble to some extent in oil indicating at least a partial oleophilic character. Characterizing examinations of the product indicate it to be a complex mixture containing from about 5 to 25% of 1,3-diamino-2-hydroxypropane, with the remainder being largely dimeric and trimeric products equivalent to those polymers obtainable by condensation of 1,3-diamino-2-hydroxypropane. The dimers appear to predominate when a high ratio of ammonia to epichlorohydrin is used, while a larger proportion of trimers are produced when lower ratios of ammonia to epichlorohydrin are used.

The polymeric portion of the product of the condensation of ammonia and epichlorohydrin appears to be a mixture of secondary and tertiary amino compounds having for the most part units of the following configuration:

Thus, the dimer is
H—(NH—CH₂—CHOH—CH₂)₂—NH₂, i. e.,
NH₂-CH₂-CHOH-CH₂-NH-CH₂-CHOH-CH₂-NH₂ containing both primary and secondary amino groups, while the trimers are probably linear, including cyclic, and cross-linked polymers, the open-chain linear trimer molecules containing only primary and secondary amino groups, the closed ring linear trimer molecules containing only secondary amino groups, and the cross-linked trimers containing only primary and tertiary amino nitrogens, thus:

H-(NH-CH₂-CHOH-CH₂)₃-NH₂—open-chain linear trimer (-NH-CH₂-CHOH-CH₂-)₃—closed ring linear trimer (NH₂-CH₂-CHOH-CH₂-)₃-N—cross-linked trimer The polymeric product also contains a smaller proportion of corresponding molecules having units of the isomeric configuration:

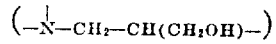

wherein the alcoholic hydroxyl group is a primary alcohol instead of a secondary alcohol and one of the amino nitrogens is attached to a secondary carbon atom instead of to a primary carbon atom. Additionally, it is considered that at least a significant proportion of the polymeric product is made up of oxy-ether molecules corresponding to those obtainable from condensation of the monomer through the alcoholic hydroxyl group, with or without condensation through amino groups, thus forming polyamino oxy compounds in which a portion or all of the oxy oxygen is present as ether-oxygen, i. e., as alkoxy-oxygen. While it is considered that this general description of the product is correct, the exact configurations of the polymeric constituent molecules of the mixture have not been definitely determined. The different products before amide formation vary from a thick liquid to a hard resin-like substance. In general, it is desirable to utilize products which, at least prior to application to the hydrophilic inorganic solid, have molecular weights not greater than about 1000. As the result of heat treatment applied after application of the improving agent to the inorganic solid, separately or in contact with the oleophilic base material, the improving agent may be further polymerized to give products with much higher molecular weights.

The ammonia - epichlorohydrin condensation product, either before or after separation therefrom of the sodium chloride, is mixed with a higher fatty acid, or mixtures thereof, such as by mixing with tallow fatty acid amides or with acids derived from animal or vegetable oils or by the partial oxidation of hydrocarbon mixtures such as various petroleum fractions, and the mixture is heated at a temperature from about 150° C. to about 225° C. for a period of from about 15 minutes to about two hours, or longer if desired, whereby the ammonia-epichlorohydrin product is converted to an amide. For use in the present invention, sufficient acid may be employed to react in the formation of amides from all of the primary or secondary amino groups present or to form salts with the tertiary amino groups, but it is preferred to form amides of the oleophilic acid with between about ⅓ and ⅔ of the amino nitrogen groups present in the condensation product. It will be understood, however, that in the case of condensation products formed from amines and halohydrins selected to give products containing a substantial proportion of oleophilic groups, which products will be substantially oil-soluble, it will not be necessary to acylate or amidate the condensation product in order to provide the necessary oleophilic characteristic required for utility in the invention. Following the amide formation, which occurs during the indicated heating period with the acid, the hot fluid condensation amide may be decanted from any inorganic salt present. If a more refined product is desired a solvent may be added in order to thin the mixture following which salt may be removed by decantation, filtration or centrifugation. The amides are usually waxy, yellowish, solids with softening points generally between 160° F. and 250° F. The tallow fatty acid amide appears to be a sticky gel which is exceptionally sticky at room temperature but which melts at 200° F.

Various organic acidic materials may be used for the formation of the amides, the fatty and naphthenic acids being preferred. Representative suitable fatty acids are: lauric, oleic, linoleic, palmitic, stearic, carnaubic, and the like. Various naphthenic acids recoverable from petroleum fractions may be used, as well as resin acids such as abietic, pimaric, and the like, as well as other cyclic acids such as salicylic acid and alkyl salicylic acids. Acid mixtures such as may be obtained from coconut fat, wool fat, castor oil, and the like are also well adapted for use in the invention. Dibasic acids, particularly alkene- and alkane-1,2-dicarboxylic acids, such as octadecenyl and octadecyl succinic acids are also particularly suitable.

In a similar preparation of an amine-halohydrin condensation product from a dihalohydrin, the dihalohydrin may be cooled to a temperature of 10° C. to about −10° C., after which dry gaseous ammonia is introduced into it. The reaction mass is then stirred at room temperature for a matter of days. The oil product thus obtained is soluble in water and in alcohol, and is converted into a hydrophobic material, that is a material possessing hydrophobic properties in a substantial part thereof, by amide formation with higher fatty acids, as already indicated. When still higher molecular weight materials are desired, the reaction may be continued at higher temperatures in the order of 70–100° C., preferably under pressure.

A typical preparation from a dichlorohydrin with an alkylene polyamine comprises heating 17.6 mols of glycerol dichlorohydrin and 10 mols of tetraethylenepentamine with an aqueous solution of 10 mols of sodium hydroxide at about 70° C. for 90 minutes. The resulting firm gel is then readily acylated while dispersed in a suitable solvent or diluent.

For application of the improving agents of this invention to the inorganic gel greases, the greases may be prepared similar to the method of the Kistler patent already referred to. Specifically, this method comprises forming an aerogel of an inorganic gelling material such as silica, alumina and the like. The condensation products such as the epichlorohydrin-ammonia-acid partial amide are dissolved in a suitable oil. The aerogels may be incorporated directly in the oil by initially stirring and then sheared by milling, to obtain a product of optimum penetration characteristics. Alternatively, the aerogel formation technique may be avoided by the preparation of hydrogels by any of the well-known processes such as acidification of sodium silicate and/or sodium aluminate, with the strong acids such as hydrochloric or sulfuric acids. The hydrogel is washed to remove salts and then is dehydrated by azeotropic distillation with an alcohol or similar water miscible solvent such as acetone. The resulting alcogel can then be incorporated directly in the oil containing the improving agent of the invention, after which the alcohol is removed by distillation or by hot milling. In the latter instance, the operations of solvent removal and grease formation are simultaneous. In any case, the grease is formed so as to have incorporated therein the inorganic gel in a non-collapsed form.

A second type of inorganic gel grease comprises those containing clay-like materials, particularly normally hydrophilic clays, which have been converted to have only oleophilic characteristics, as by treatment with the agents of this invention. In this case, the initially hydrophilic clay may be dispersed in water to form a hydrogel and dehydrated by azeotropic distillation with alcohol. The alcogel which results can then be treated with the agents of the invention, such as the acylated condensation products already described hereinbefore to produce an oleophilic clay. By first converting the amino agent to a salt of a water-soluble acid, preferably inorganic, such as the chloride, an ion exchange reaction can be obtained, apparently between the alkali components of the clay and the alky ammonium groups of the condensation product. In this case an aqueous dispersion of the clay may be used. The conversion of the clay results in a gel which has become oleophilic and which can subsequently be incorporated in oil as described for the inorganic oxide gels already referred to.

In accordance with one phase of the present invention, a water-dispersible form of the condensation product, such as the hydrochloride thereof, or other water-dispersible salt with other water-soluble acids, including organic acids such as the lower fatty acids (acetic, propionic, aminoacetic, and the like), is added to an oil containing the desired amount of higher fatty acid. Subsequent to this the entire mixture is heated at an elevated temperature between 150° C. and 225° C. for a time sufficient to convert the amine-acid mixture to the partial amide form and also to dehydrate the mixture. The oil-partial amide mixture is then compounded with clay, silica gel, alumina gel, or the like, with the formation of the desired grease gel structure. A preferred embodiment of this phase of the present invention comprises the step of heating the reactants, namely the lubricating oil, inorganic gelling agent and amide condensation product at a temperature between 100° C. and 225° C. for a period of between ½ and two hours, whether or not the gelling agent was originally a clay or an inorganic non-clay material. The purpose of this heating period is to improve the water resistant characteristics of the grease which is evidently formed. The actual change in the grease caused by this heating is obscure at the present time.

The greases which are found to have satisfactory water-proof characteristics, in accordance with the present invention, comprise a lubricating or other suitable oil containing 1 to 20% by weight of an inorganic gelling agent, based on the grease composition. Moreover, there should be present from 10 to 100% by weight of said gel of one of the improving agents already described. In its preferred form, the grease composition will contain from 2 to 10% by weight of the inorganic gel and 20 to 70% by weight of the improving agent, preferably the acylated product, based on the weight of the inorganic material.

Other ingredients may be incorporated in the compositions of the present invention, including auxiliary gelling agents, corrosion inhibitors, extreme pressure additives and oxidation inhibitors. Extreme pressure additives such as sulfurized lard oil and chlorinated paraffin wax materially imfor a period of time up to 24 hours, or any shorter period of time within which the grease appears to have deteriorated or bleeding of the oil from the grease has occurred. In the water roll test the grease was mixed with 20% by weight of water and the mixture rolled in a Shell roll test machine at about room temperature until the penetration of the grease had increased to a value of 230 decimillimeters; the result is expressed as hours required for the specified increase in penetration; the longer the time required the better the grease.

| Grease No. | Additive | Minimum micropenetration | Static hot water test | Water emulsion ANG-3A | | Oven drying of emulsion | Water roll test |
|---|---|---|---|---|---|---|---|
| | | | | $H_2O$ | Pen. | | |
| 1 | ¼ amide of 5:1 ammonia-epichlorohydrin product. | 115 | Satisfactory to 30 hours. | 17 | 110 | Satisfactory to 24 hours. | 6 |
| 2 | ½ amide of 10:1 ammonia-epichlorohydrin product. | 130 | ...do... | 40 | 138 | ...do... | 4 |
| 3 | ½ amide of ammonia-epichlorohydrin monomer. | 112 | ...do... | 40 | 132 | ...do... | 1 |
| 4 | Acetate salt of ½ amide of 10:1 ammonia epichlorohydrin polymer product. | 91 | ...do... | 38 | 100 | ...do... | 7 | prove the operation of the greases under extreme pressure conditions. Among the effective oxidation inhibitors are phenyl-beta-naphthylamine, phenyl-alpha-naphthylamine and alpha-naphthol. Another outstanding class of oxidation inhibitors which simultaneously protect metallic surfaces from rusting include the alkaline earth metal salts of condensation products of an aldehyde with an alkyl phenol. A particularly desirable variety of this class is the calcium salt of the formaldehyde condensation product with para-tertiary-octyl phenol.

The following examples illustrate the process and products of the present invention.

EXAMPLE I

Five per cent by weight of silica, as an alcogel, was dispersed in a low viscosity petroleum lubricating oil. The tallow fatty acid amide agents listed in the following tabulation were incorporated in the composition in amounts of 2.5% by weight of the composition (50% of the silica), and the composition treated, as by milling, to form a homogeneous grease structure, the composition being milled by shearing until a grease of minimum obtainable penetration is produced. The grease compositions were subjected to a number of tests to determine their resistance to water. In the static hot water test a portion of the grease was smeared on the surface of a steel strip and the strip maintained immersed in water in an inclined position at about the boiling temperature of water for a period of 30 hours or any shorter period of time within which the oil separated from the grease and collected as a separate layer on top of the water. The water emulsion test was carried out similar to the standard ANG-3A test used in the testing of grease compositions. In this test water is added in 2 cc. increments with intervening 2 minute stirring interval, until all of a 2 cc. increment of water is not absorbed by the grease in a following 2 minute stirring period, after which 4 cc. of water is added and the stirring continued for 4 minutes. The overall per cent of absorbed or emulsified water is taken as the numerical value of the test, together with the penetration of the resulting product. The oven drying test comprises spreading out the resulting product from the water emulsion test, on the inside of a 250 cc. beaker and heating it at 100° C. in an oven Thus, in all cases the greases containing the improving agents of this invention were found to be stable in the presence of cold and hot water, while unmodified silica grease disintegrates even in cold water.

EXAMPLE II

In order to demonstrate the corrosion inhibiting properties of the agents of this invention and to demonstrate the anticorrosive characteristics of inorganic gel greases containing said agents, similar cleaned iron strips of metal were coated similarly with different greases, as indicated in the following tabulation, and the coated metal strips were maintained at least partially immersed in a 20% sodium chloride aqueous solution in a closed tube at a given temperature for 24 hours. The observations by a trained observer of the resulting amount of rusting of the surfaces of the metal strips were used as a basis of comparison, a value of zero being used to designate no rusting and a value of ten being used to designate rusting of substantially all of the metal surface.

*Corrosivity of greases*

| | Grease composition | Corrosion rating |
|---|---|---|
| 1 | Mineral oil+8% by weight of lithium hydroxystearate. | 4 |
| 2 | Silica gel grease containing 15-20% of hydrogenated castor oil, based on the silica. | 7 |
| 3 | Same as (2) and containing additionally, phenyl alphanaphthylamine and hexadecenylsuccinic acid. | 5 |
| 4 | Silica gel grease containing the ½ amide of the 10:1 ammonia : epichlorohydrin polymer product. | 4 |

EXAMPLE III

When the oxidation induction period of a silica gel grease containing a partial higher fatty acid amide of an ammonia-epichlorohydrin polymer product, as described already, was determined, in comparison with that of a similar silica gel grease but containing 2,6 - ditertiary butyl - 4 - methyl phenol, as antioxidant, it was found that the oxidation induction period of the grease made in accordance with the present invention was as much as 50% greater than that of the grease containing the well-known mineral oil antioxidant.

EXAMPLE IV

When an aqueous dispersion of a natural montmorillonite clay is intimately contacted with an aqueous dispersion of the chloride (hydrochloride) salt of a partial stearic acid amide of a polymeric condensation product of ammonia and beta-glycerol chlorohydrin the clay becomes oleophilic. Incorporation of the resulting oleophilic clay in a mineral oil fraction, preferably with milling, yields a grease structure which is resistant to contact with water. Prolonged heating of the composition markedly improves the water-resistance of the grease.

EXAMPLE V

When alpha glycerol chlorohydrin and stearyl amine are reacted together in approximately equal molar proportions, in the presence of a molar proportion of an alkali hydroxide, a product containing a predominant proportion of the compound, stearyl 2,3-dihydroxypropylamine is obtained. When 10% by weight of this product, after separation from inorganic salt, is dissolved in a mineral oil fraction, and said solution is intimately contacted with about 10% by weight of an uncollapsed silica aerogel, a satisfactory grease is obtained.

EXAMPLE VI

When a silica alcogel is intimately mixed with substantially an equal proportion of a mixture of glycerol dichlorohydrin and tetraethylenepentamine, in a two to one mol ratio, and the mixture heated together with an aqueous solution of one mol of sodium hydroxide for each mol of the amine, at about 75° C., the silica is converted into an oleophilic material. The oleophilic silica material, after separation from the reaction mixture, is readily incorporated with a mineral oil fraction, with a shearing action as in milling, to produce an excellent grease, which is remarkably resistant to the action of water, both at normal atmospheric temperature and at elevated temperatures.

The invention claimed is:

1. A grease composition having high resistance to disintegration by water comprising a lubricating oil, from about 2% to about 10% by weight of said composition of a silica gel, and from about 20% to about 70% by weight of said gel of a tallow fatty acid partial amide of a condensation product of epichlorohydrin and ammonia.

2. A grease composition having high resistance to disintegration by water comprising a lubricating oil, from about 2% to about 10% by weight of said composition of a silica gel, and from about 20% to about 70% by weight of said gel of a stearic acid partial amide of a condensation product of epichlorohydrin and ammonia.

3. A grease composition having high resistance to disintegration by water comprising a lubricating oil, from about 2% to about 10% by weight of said composition of a silica gel, and from about 20% to about 70% by weight of said gel of an oleic acid partial amide of a condensation product of epichlorohydrin and ammonia.

4. A grease composition having high resistance to disintegration by water comprising a lubricating oil, from about 2% to about 10% by weight of said composition of an oleophilic clay gelled therein, said clay being a product of an interaction of a natural clay and from about 10% to about 100% by weight of the clay of a water-insoluble acylated product of an organic poly amino hydroxy condensation product of a polyfunctional halohydrin and a basic nitrogenous substance having at least one hydrogen atom directly attached to a nitrogen atom.

5. As a lubricant having high resistance to disintegration by water, an organo gel having as its characterizing constituents an inorganic solid phase in an amount sufficient to impart a gelled structure thereto, a major proportion of a lubricating oil, and a minor amount sufficient to materially improve the water resistance of said gel of a water-insoluble acylated product of an organic polyamino hydroxy condensation product of a polyfunctional halohydrin and a basic nitrogenous substance having at least one hydrogen atom directly attached to a nitrogen atom.

6. A grease composition having high resistance to disintegration by water comprising a lubricating oil, from about 1% to about 20% by weight of an inorganic gel, and from about 10% to about 100% by weight of said gel of a higher fatty acid amide of a condensation product of a monochloroepoxyalkane and ammonia.

7. A grease composition having high resistance to disintegration by water comprising a lubricating oil, from about 1% to about 20% by weight of said composition of an inorganic oxide gel, and from about 10% to about 100% by weight of said gel of a higher fatty acid amide of a condensation product of epichlorohydrin and ammonia.

8. A grease composition having high resistance to disintegration by water comprising a lubricating oil, from about 1% to about 20% by weight of said composition of a silica gel, and from about 10% to about 100% by weight of said gel of a higher fatty acid partial amide of a condensation product of epichlorohydrin and ammonia.

9. A grease composition having high resistance to disintegration by water comprising a mineral lubricating oil, from about 2% to about 10% by weight of said composition of an oleophilic montmorillonite clay gelled therein, said clay being an ion exchange product of a montmorillonite clay with a salt of a higher fatty acid partial amide of a condensation product of epichlorohydrin and ammonia.

10. A grease composition having high resistance to disintegration by water comprising a mineral lubricating oil, from about 2% to about 10% by weight of said oil, a grease-forming amount of an oleophilic aluminum bentonite gelled therein, said oleophilic bentonite being an ion exchange product of an aluminum bentonite and a salt of a higher fatty acid partial amide of a condensation product of epichlorohydrin and ammonia.

11. A grease composition having high resistance to disintegration by water comprising an organic lubricating oil, a grease-forming amount of an initially hydrophilic inorganic gel, and from about 10% to about 100% by weight of said inorganic gel of a water-insoluble higher fatty acid amide of a condensation product of a polyfunctional halohydrin and ammonia.

12. An oleaginous composition having high resistance to disintegration by water comprising an oleaginous liquid thickened to a gel grease-like consistency by addition thereto of from about 1% to about 20% by weight of said composition of an initially hydrophilic solid inorganic gel and from about 10% to about 100% by weight of said inorganic gel of an at least partially oleophilic poly amino oxy compound containing at least 3 amino nitrogen atoms and oxy groups together spaced apart in the molecule by not more than 10 carbon atoms.

13. An oleaginous composition having high resistance to disintegration by water comprising an oleaginous liquid thickened to a gel grease-like consistency by addition thereto of from about 1% to about 20% by weight of said composition of an initially hydrophilic solid inorganic gel and from about 10% to about 100% by weight of said inorganic gel of an at least partially oleophilic poly amino oxy compound containing at least 3 amino nitrogen atoms and oxy groups together.

14. A grease composition according to claim 8, wherein the lubricating oil is a mineral lubricating oil.

15. A grease composition according to claim 11 wherein the lubricating oil is a mineral lubricating oil.

16. A grease composition according to claim 7 wherein the lubricating oil is a mineral lubricating oil.

17. A grease composition according to claim 13 wherein the oleaginous liquid is a mineral lubricating oil.

WALTER H. PETERSON.

REFERENCES CITED

The following references are of record in the file of this patent:

UNITED STATES PATENTS

| Number | Name | Date |
|---|---|---|
| 2,033,856 | Smith | Mar. 10, 1936 |
| 2,206,090 | Haggenmacher | July 2, 1940 |
| 2,248,636 | Marsden | July 8, 1941 |
| 2,260,625 | Kistler | Oct. 28, 1941 |
| 2,334,517 | Tucker | Nov. 16, 1943 |
| 2,412,929 | Bogart | Dec. 17, 1946 |
| 2,460,632 | Folda | Feb. 1, 1949 |
| 2,531,440 | Jordan | Nov. 28, 1950 |
| 2,554,222 | Stross | May 22, 1951 |

Certificate of Correction

Patent No. 2,623,852     December 30, 1952

WALTER H. PETERSON

It is hereby certified that error appears in the printed specification of the above numbered patent requiring correction as follows:

Column 14, lines 52 and 53, for "oil, a grease-forming amount" read *composition*;

and that the said Letters Patent should be read as corrected above, so that the same may conform to the record of the case in the Patent Office.

Signed and sealed this 23rd day of June, A. D. 1953.

[SEAL]

THOMAS F. MURPHY,
*Assistant Commissioner of Patents.* containing at least 3 amino nitrogen atoms and oxy groups together spaced apart in the molecule by not more than 10 carbon atoms.

13. An oleaginous composition having high resistance to disintegration by water comprising an oleaginous liquid thickened to a gel grease-like consistency by addition thereto of from about 1% to about 20% by weight of said composition of an initially hydrophilic solid inorganic gel and from about 10% to about 100% by weight of said inorganic gel of an at least partially oleophilic poly amino oxy compound containing at least 3 amino nitrogen atoms and oxy groups together.

14. A grease composition according to claim 8, wherein the lubricating oil is a mineral lubricating oil.

15. A grease composition according to claim 11 wherein the lubricating oil is a mineral lubricating oil.

16. A grease composition according to claim 7 wherein the lubricating oil is a mineral lubricating oil.

17. A grease composition according to claim 13 wherein the oleaginous liquid is a mineral lubricating oil.

WALTER H. PETERSON.

REFERENCES CITED

The following references are of record in the file of this patent:

UNITED STATES PATENTS

| Number | Name | Date |
|---|---|---|
| 2,033,856 | Smith | Mar. 10, 1936 |
| 2,206,090 | Haggenmacher | July 2, 1940 |
| 2,248,636 | Marsden | July 8, 1941 |
| 2,260,625 | Kistler | Oct. 28, 1941 |
| 2,334,517 | Tucker | Nov. 16, 1943 |
| 2,412,929 | Bogart | Dec. 17, 1946 |
| 2,460,632 | Folda | Feb. 1, 1949 |
| 2,531,440 | Jordan | Nov. 28, 1950 |
| 2,554,222 | Stross | May 22, 1951 |

Certificate of Correction

Patent No. 2,623,852 December 30, 1952

WALTER H. PETERSON

It is hereby certified that error appears in the printed specification of the above numbered patent requiring correction as follows:

Column 14, lines 52 and 53, for "oil, a grease-forming amount" read *composition*;

and that the said Letters Patent should be read as corrected above, so that the same may conform to the record of the case in the Patent Office.

Signed and sealed this 23rd day of June, A. D. 1953.

[SEAL]

THOMAS F. MURPHY,
*Assistant Commissioner of Patents.*

Certificate of Correction

Patent No. 2,623,852                                              December 30, 1952

WALTER H. PETERSON

It is hereby certified that error appears in the printed specification of the above numbered patent requiring correction as follows:

Column 14, lines 52 and 53, for "oil, a grease-forming amount" read *composition*;

and that the said Letters Patent should be read as corrected above, so that the same may conform to the record of the case in the Patent Office.

Signed and sealed this 23rd day of June, A. D. 1953.

[SEAL]

THOMAS F. MURPHY,
*Assistant Commissioner of Patents.*